United States Patent
Kulkarni et al.

(10) Patent No.: US 11,636,198 B1
(45) Date of Patent: Apr. 25, 2023

(54) SYSTEM AND METHOD FOR CYBERSECURITY ANALYZER UPDATE AND CONCURRENT MANAGEMENT SYSTEM

(71) Applicant: FireEye, Inc., Milpitas, CA (US)

(72) Inventors: Neeraj Kulkarni, Milpitas, CA (US); Robert M. Beard, Jr., Charlotte, NC (US); Robin Caron, Charlotte, NC (US)

(73) Assignee: FireEye Security Holdings US LLC, San Jose, CA (US)

( * ) Notice: Subject to any disclaimer, the term of this patent is extended or adjusted under 35 U.S.C. 154(b) by 472 days.

(21) Appl. No.: 16/796,541

(22) Filed: Feb. 20, 2020

Related U.S. Application Data

(60) Provisional application No. 62/827,039, filed on Mar. 30, 2019.

(51) Int. Cl.
  *G06F 21/54* (2013.01)
  *G06F 21/56* (2013.01)
  (Continued)

(52) U.S. Cl.
  CPC .............. *G06F 21/54* (2013.01); *G06F 8/65* (2013.01); *G06F 9/546* (2013.01); *G06F 21/564* (2013.01); *G06F 21/566* (2013.01); *G06F 21/577* (2013.01)

(58) Field of Classification Search
  CPC . G06F 21/54; G06F 8/65; G06F 9/546; G06F 21/564; G06F 21/566; G06F 21/577
  See application file for complete search history.

(56) References Cited

U.S. PATENT DOCUMENTS

| 6,898,632 B2 | 5/2005 | Gordy et al. |
| 6,941,348 B2 | 9/2005 | Petry |

(Continued)

FOREIGN PATENT DOCUMENTS

| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Trong H Nguyen
(74) *Attorney, Agent, or Firm* — Rutan & Tucker, LLP

(57) ABSTRACT

An electronic device for receiving and seamlessly providing cybersecurity analyzer updates and concurrent management systems for detecting cybersecurity threats including a processor and a memory communicatively coupled to the processor. The memory stores an analyzer logic to generate a first analyzer configured to receive a suspicious object for threat evaluation, an inspection logic to manage a first queue of suspicious objects for threat evaluation to the first analyzer, and an update logic to receive updated cybersecurity analytics content data. The analyzer logic receives updated cybersecurity analytics content data and can generate a second analyzer that incorporates at least a portion of the parsed updated cybersecurity analytics content data. In response to the generation of the second analyzer, the inspection logic manages a second queue of subsequent suspicious objects and sends the subsequent suspicious objects to the second analyzer for threat evaluation, thereby minimizing downtime during the analyzer update process.

21 Claims, 5 Drawing Sheets

(51) Int. Cl.
    *G06F 9/54*         (2006.01)
    *G06F 21/57*       (2013.01)
    *G06F 8/65*         (2018.01)

(56) References Cited

U.S. PATENT DOCUMENTS

| | | |
|---|---|---|
| 7,080,407 B1 | 7/2006 | Zhao et al. |
| 7,080,408 B1 | 7/2006 | Pak et al. |
| 7,243,371 B1 | 7/2007 | Kasper et al. |
| 7,308,716 B2 | 12/2007 | Danford et al. |
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,122,503 B1 * | 9/2015 | Hoff .................. G06F 9/45558 |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 * | 6/2017 | Singh .................. G06N 5/025 |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |

(56) References Cited

U.S. PATENT DOCUMENTS

| | | |
|---|---|---|
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Deshpande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |

(56) References Cited

U.S. PATENT DOCUMENTS

| | | |
|---|---|---|
| 10,902,119 B1 | 1/2021 | Vashisht et al. |
| 10,904,286 B1 | 1/2021 | Liu |
| 10,929,266 B1 | 2/2021 | Goradia et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096018 A1* | 4/2015 | Mircescu ............ G06F 21/577 726/23 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0113653 A1* | 4/2015 | Song .................... H04L 63/145 726/24 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |

(56) References Cited

U.S. PATENT DOCUMENTS

| | | |
|---|---|---|
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0241580 A1 | 8/2016 | Watters et al. |
| 2016/0241581 A1 | 8/2016 | Watters et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0323295 A1 | 11/2016 | Joram et al. |
| 2016/0335110 A1 | 11/2016 | Paithane et al. |
| 2017/0083703 A1 | 3/2017 | Abbasi et al. |
| 2017/0359217 A1* | 12/2017 | Ahuja .............. H04L 63/0227 |
| 2018/0013770 A1 | 1/2018 | Ismael |
| 2018/0048660 A1 | 2/2018 | Paithane et al. |
| 2018/0069891 A1 | 3/2018 | Watters et al. |
| 2018/0121316 A1 | 5/2018 | Ismael et al. |
| 2018/0288077 A1 | 10/2018 | Siddiqui et al. |
| 2019/0104154 A1 | 4/2019 | Kumar et al. |
| 2019/0132334 A1 | 5/2019 | Johns et al. |
| 2019/0207966 A1 | 7/2019 | Vashisht et al. |
| 2019/0207967 A1 | 7/2019 | Vashisht et al. |
| 2020/0252428 A1 | 8/2020 | Gardezi et al. |
| 2022/0103593 A1* | 3/2022 | Singh .............. H04L 63/0245 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), p. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Disco "Intrusion Prevention for the Cisco ASA 5500-x Series" Data Sheet (2012).

Dohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10 1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

(56) References Cited

OTHER PUBLICATIONS

Sohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", SECURITY & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

SYSTEM AND METHOD FOR CYBERSECURITY ANALYZER UPDATE AND CONCURRENT MANAGEMENT SYSTEM

CROSS-REFERENCE TO RELATED APPLICATION

This application claims the benefit of U.S. Provisional Application No. 62/827,039, filed Mar. 30, 2019, the entire contents of both are incorporated herein by reference.

FIELD

Embodiments of the disclosure relate to the field of cybersecurity. More specifically, certain embodiments of the disclosure relate to a system, apparatus and method for updating and concurrently managing (sometimes referred to as seamlessly updating) multiple threat analyzers for cybersecurity systems.

BACKGROUND

Over the last decade, malicious software (malware) has become a pervasive problem for Internet users. Often, malware is a program or file embedded within downloadable content and designed to adversely influence (e.g., attack) normal operations of a computer. Examples of different types of malware may include bots, computer viruses, worms, Trojan horses, spyware, adware, or any other programming that operates within the computer without permission.

For example, malware may be embedded within objects hosted on a web site, which can be subsequently downloaded on a user's computing device in response to requesting a web page from the web site containing those objects. Once downloaded and processed, this malware (i.e. malicious content) can unknowingly download and install additional malicious objects that can further a cyberattack on the computing device. Similarly, malware may also be installed on a computing device upon receipt, or opening, of an electronic mail (email) message. For example, an email message may contain an attachment, such as a Portable Document Format (PDF) document, containing embedded executable malware. Further, malware may exist in computer files infected through any of a variety of attack vectors, which can then be uploaded from the infected computer onto other network devices thereby furthering the spread of the malware.

Recently, various types of cybersecurity methods have been deployed that have attempted to find malware within files or other network content. Often, these methods evaluate objects suspected of being a threat (i.e. malicious) and make a determination if the object is either a cybersecurity threat or not a threat (i.e. benign). Malware detection systems can utilize, for example software, to inspect processes, stored files and network content (e.g., objects of email, webpages, network traffic) in real-time or near real-time on a variety of devices, including endpoint devices of a network. In many cases, indicators such as signatures may be utilized by the systems to detect suspicious objects and other artifacts of cyberattacks.

As malware adapts and evolves to existing cybersecurity measures and new cyberattacks are launched, the techniques utilized in such detection, and the indicators used, must also be updated. Such updating can be achieved by a remote updating process over a network connection, or through a direct update delivered via a physical interconnect such as Universal Serial Bus ("USB"). In many systems, updating can require a short, yet discreet period of downtime to complete requiring the cybersecurity system to cease functioning. This downtime can lead to potential lapses in detection of cyberthreats by the cybersecurity system during the update process. Additionally, conventional update processes can create a queue of objects to be evaluated and/or allow for certain objects to not be evaluated for threats, leading to an increased cybersecurity risk.

Conventional systems of updating endpoints typically perform these updates by bringing the currently running analyses to an end, and then performing any updates to the necessary components within the system. During the update process, the endpoint device cannot process newly received suspicious objects. In this condition, the endpoint devices must either delay cybersecurity analyses on these suspicious objects until the update process is complete or ignore the suspicious objects entirely. In the former situation, the endpoint devices may halt processing temporarily until the update process is completed, which can create bottlenecks and inefficiencies. In the latter situation, the endpoint devices are left vulnerable to attacks as newly received suspicious objects are ignored and not processed. Other cybersecurity systems may wait to apply the update until a reboot or other shutdown process is occurring to not interfere with normal operation of the endpoint device. In these instances, the endpoint devices may be left vulnerable to cyberattacks that would have been detected had the update been applied immediately.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
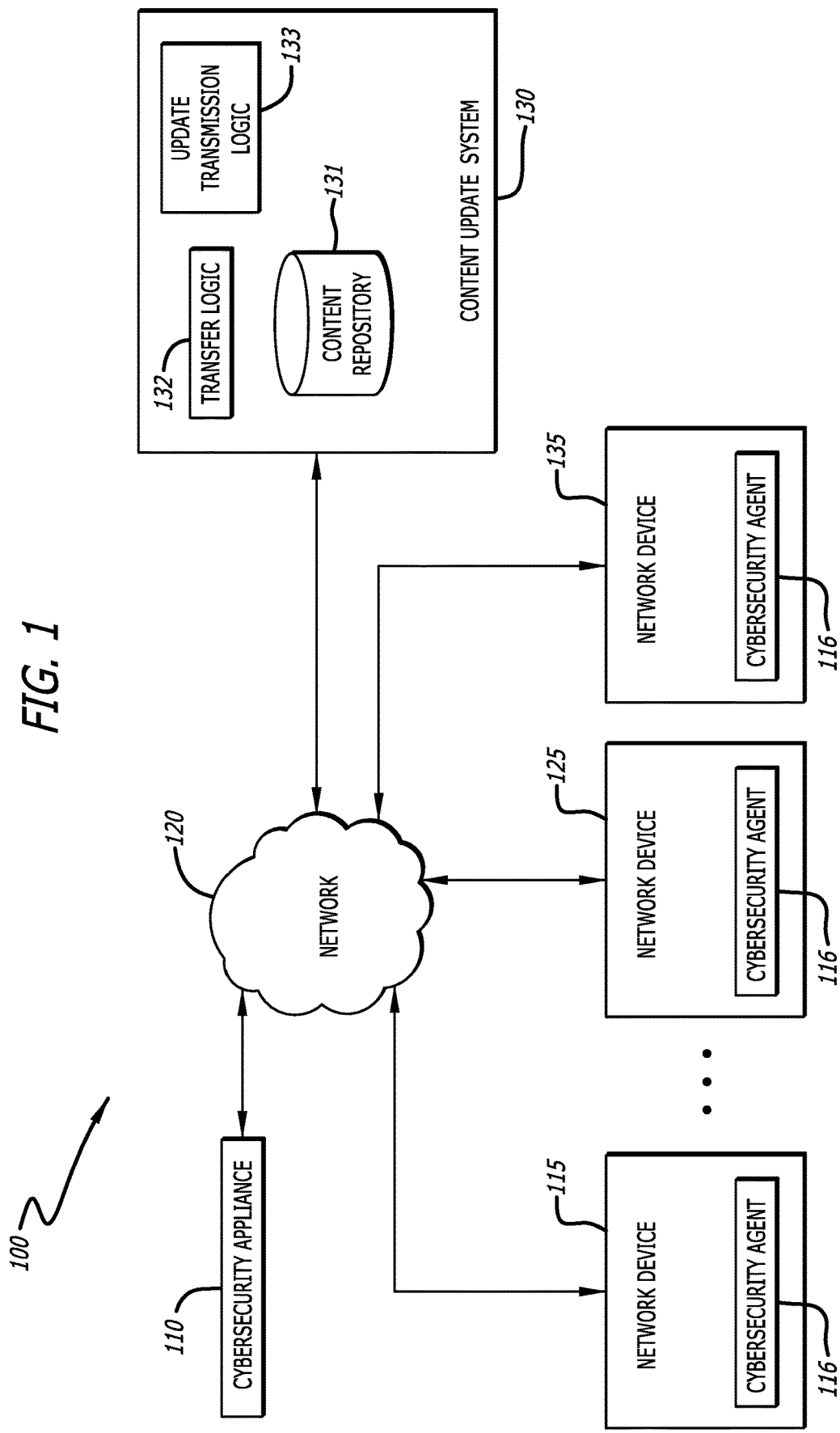
FIG. 1 depicts an exemplary system diagram of a communication cybersecurity analyzer update and concurrent management system comprising a plurality of network devices and cybersecurity appliances in communication with a content update system in accordance with an embodiment of the invention.

Based on the problems identified above, there is a need for a cybersecurity system that may be updated without creating a break in the analysis of suspicious objects. Various embodiments of the disclosure relate to a system or method configured to concurrently manage cybersecurity analyzers during updates such as that resident on a protected endpoint device. The methods and systems disclosed herein utilize at least two cybersecurity analyzers wherein a first analyzer is operable to protect an endpoint device, but, during an update process at least a second analyzer is launched (i.e., generated) to protect the endpoint device. The second generated analyzer may be a software instance of the first analyzer, but the second analyzer includes or is modified with at least some of the updated functions, features, or data received from the update process. In some embodiments, the two analyzers may constitute different instances (i.e., processes) of a single analysis program, sharing some, but not necessarily all, of the components of the analysis program. Once the second analyzer is generated successfully a queue or queues (i.e., ordered storage for object or object identifiers (IDs)) of the cybersecurity system that manages the inflow of suspicious objects for processing can direct (i.e., make available) all subsequently received suspicious objects to the updated second analyzer instead of the first analyzer.

The components (e.g., algorithms, functions, resources, memory, etc.) shared by the first and second analyzers may include the core logic or engines of the analysis program that perform analysis. The components that differ between the first and second analyzers (that is, the just-mentioned functions, features, or data) may include the cybersecurity analytics content (sometimes referred to as security content), which, in various embodiments of the disclosure, include, for example, one or more sets of rules. These rule sets may include detection rules, which, when applied, may be used in detecting specific indicators (e.g., artifacts or characteristics of the object such as compliance with applicable communication protocols, or its behavior during processing) that may be associated with suspiciousness, maliciousness or at least unwanted content/activities. The rule set may also include classification rules that may be used in determining whether the detected indicators correspond (e.g., correlate) to known indicators of a cyberattack sufficiently to allow the analyzer to declare (and report) the object as malicious, that is, a threat associated with a cyberattack.

In some embodiments, queued items (e.g., objects or object IDs) already in the queue for the first analyzer are allowed to finish under the original, non-updated cybersecurity analytics content, e.g., a non-updated rule set applied by the first analyzer. In response to the queue from the first analyzer being depleted (i.e., drained), the first analyzer is terminated or otherwise marked for reclamation via typical memory management methods. At that point, analysis of any additionally received objects may be carried out by the second analyzer, using the updated set of rules or other security content. In some embodiments, once the second analyzer has been successfully created, some or all of the remaining queue (e.g., objects or object IDs) of the first analyzer may be transferred to the second analyzer if doing so would not create a significant gap in processing or other degradation in service. In yet other embodiments, the remaining suspicious objects in the first queue may be duplicated within a second queue, allowing for comparisons to be made between the results of analysis by the first analyzer applying a first set of rules or other cybersecurity analytics content and the results of analysis by the second analyzer applying a second set of rules or other cybersecurity analytics content. As a result, the cybersecurity system or subsystem can generate comparison or correlation data that may aid in the detection of cybersecurity threats or sent to a cybersecurity analyst for troubleshooting and analysis of the first and second cybersecurity analytics content. Thus, the system can be configured to manage the queue in such a way that the threat detection process is not paused, stopped or otherwise interrupted by the update process.

As an illustrated example, a server may communicate with a cybersecurity agent, namely logic operating on an endpoint device supporting rule-based cybersecurity analytics that an update is available. The cybersecurity agent receives the cybersecurity analytics content update from the server and identifies the appropriate analyzer associated with the updated rule content. The cybersecurity agent initializes a second analyzer and configures its operation with the updated rule content while allowing, in the meantime, the first analyzer to continue operating with current, pre-updated rule content. Once the cybersecurity agent initializes the second analyzer, objects to be analyzed may be "routed" (i.e., sent or otherwise made available) to the second analyzer while no further objects are provided to the first analyzer. Once the first analyzer completes processing objects being analyzed, the cybersecurity agent terminates (i.e. exits) the first analyzer while the second analyzer remains in operation. In this way, the cybersecurity protection provided to the endpoint device does not experience downtime in its processing of objects during the update process.

The cybersecurity analytics content may include a set of core data that can include, but is not limited to, new indicators, new rules, new methods of operation for pre-configured analyzers within the cybersecurity system, new analyzers that can be generated via an analyzer generation logic, an updated analyzer generation logic that can parse and select analyzers based on the type of object and associated context data, and/or updated thresholds and reporting rules for threat evaluation and remedial actions.

These analytics updates may be provided periodically or aperiodically in response to detecting new threats or other security concerns. In many embodiments, the analytics updates may be provided by a threat detection vendor. Alternatively, in certain embodiments, cybersecurity analytics updates may be created by an enterprise or other organization and distributed on a private network within and for use by the organization.

One practical application of the invention is to reduce or eliminate downtime in threat analysis during the update period. In this way, the threat analysis logic, such as inspection logic, is maintained and these devices are less vulnerable to cyberattacks. Unlike conventional fail-safe systems that simply utilize redundant components to avoid single points of failure, embodiments disclosed herein allow for the concurrent analyzer management and cybersecurity analytics update process to occur on a single endpoint device such as through a plurality of differentiated (updated and non-updated) analyzer processes, for example, without the need for additional systems. By having such a method and system in place, solutions can be provided that allow users to reduce costs and spend less time planning and scheduling updates on a system or within a network.

I. Terminology

In the following description, certain terminology is used to describe features of the invention. For example, in certain situations, the term "logic" is representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "network content" generally refers to information transmitted over a network as one or more messages, which generally refer to signaling (wired or wireless) as either information placed in a prescribed format and transmitted in accordance with a suitable delivery protocol or information made accessible through a logical data structure such as an API. Examples of the delivery protocol include but are not limited or restricted to HTTP (Hypertext Transfer Protocol); HTTPS (HTTP Secure); Simple Mail Transfer Protocol (SMTP); File Transfer Protocol (FTP); iMessage; Instant Message Access Protocol (IMAP); or the like. Hence, each message may be in the form of one or more packets, frame, or any other series of bits having the prescribed, structured format.

Yet another example of network content includes one or more files that are transferred using a data transfer protocol such as File Transfer Protocol (FTP) for subsequent storage on a file share. Where the network content is email, Instant Message or a file, the header may include the sender/recipient address, the sender/recipient phone number, or a targeted network location of the file, respectively.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that application software in a malicious manner; (2) alters the functionality of an electronic device executing that application software without any malicious intent; and/or (3) provides an unwanted functionality which is generally acceptable in other context.

The term "object" generally refers to content in the form of an item of information having a logical structure or organization that enables it to be classified for purposes of analysis for malware. One example of the object may include an email message or a portion of the email message. Another example of the object may include a storage file or a document such as a Portable Document Format (PDF) document, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the electronic device.

Logic may be software that includes code being one or more instructions, commands or other data structures that, when processed (e.g., executed) to perform a particular operation or a series of operations. Examples of software include an application, a process, an instance, Application Programming Interface (API), subroutine, plug-in, function, applet, servlet, routine, source code, object code, shared library/dynamic link library (dll), or a collection of HTML elements. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

The term "transmission medium" may constitute a physical or virtual communication link between two or more systems. For instance, the transmission medium may correspond to a physical (wired or wireless) communication link between two or more network devices (defined below). The physical communication link may include electrical wiring, optical fiber, cable, bus trace, or a wireless channel using infrared, radio frequency (RF), or any other wired/wireless signaling mechanism. Alternatively, the transmission medium may correspond to a virtual communication link that provides logical connectivity between different logic (e.g. software modules).

The term "network device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of a network device may include, but are not limited or restricted to, the following: a server, a mainframe, a cybersecurity device, a firewall, a router; an info-entertainment device, industrial controllers, vehicles, or an endpoint device (e.g., a laptop, a smartphone, a tablet, a desktop computer, a netbook, gaming console, a medical device, or any general-purpose or special-purpose, user-controlled electronic device).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary system diagram of a cybersecurity analyzer update and concurrent management system 100 with a plurality of network devices 115, 125, 135 and cybersecurity appliance 110 in communication with a content update system 130 is shown. The cybersecurity analyzer update and concurrent management system 100 may include a plurality of network devices 115, 125, 135 commutatively couple to a network 120, each of the network devices 115, 125, 135 includes a cybersecurity agent 116, which is configured to evaluate suspicious objects, create determinations on potential threat levels, and/or take remedial actions. Additionally, the cybersecurity analyzer update and concurrent management system 100 may also include a cybersecurity appliance 110 in communication with the content update system 130 via the network 120. It is contemplated and implied in FIG. 1 that any number of network devices 115, 125, 135 or cybersecurity appliances 110 may be commutatively coupled to the network 120 and thus to the content update system 130. Network devices 115, 125, 135 as well as cybersecurity appliance 110 may communicate over private and/or public transmission mediums through the network 120 including the Internet, direct connections between the devices and/or via a wireless network access point.

The content update system 130 is depicted in FIG. 1 as having a content repository data store 131 along with update transmission logic 133 as well as transfer logic 132. In many embodiments, the content repository data store 131 includes updated cybersecurity analytics content data (sometimes referred to as security content update data) that can be transmitted as software updates to connected network devices 115, 125, 135, and utilized by the cybersecurity agent 116. These updates may occur periodically or aperiodically. In some embodiments, the updates are formatted and transmitted as messages suitable for network communication by the transfer logic 132. In some embodiments, the update transmission logic 133 may generate updated cybersecurity analytics content data to be provided to the content repository data store 131. By way of example and not limitation, the update transmission logic 133 may acquire data from a vendor cybersecurity expert, outside cybersecurity source, and/or by internally generated processes. The acquired data may then be formatted by the update transmission logic 133 into a format suitable for updating cybersecurity agents 116 and stored within the content repository data store 131 for future transmission.

In many embodiments, the cybersecurity agent 116 and cybersecurity appliance 110 may be configured to perform cybersecurity threat analytics, such as inspecting ingress data traffic, identifying whether any artifacts of the data traffic may include malware, and if so, analyzing at least those artifacts. In certain embodiments, these analytics may be conducted in a virtual machine to detect anomalous behaviors that would be present if the data traffic was actually processed by network devices 115, 125, 135. As a result of the inspections done by the cybersecurity agent 116 and/or the cybersecurity appliance 110, artifacts and objects can be determined to either be malicious or benign.

In a variety of embodiments, when new threats or methods of detection have been developed, data to update the method of operation or particular parameters used in the analytics ("cybersecurity analytics content data") may be developed and stored in the content repository data store 131 for transmission over the network 120 to network-connected endpoint devices (having cybersecurity agents 116) or cybersecurity appliances 110. The delivery of the updated cybersecurity analytics content data may be automatic (e.g. periodic or responsive to a particular threat such as a prescribed number of updates available, prescribed time, hours elapsed, etc.) or manually triggered by an administrator. In certain embodiments, the updated cybersecurity analytics content data can be provided in an offline process such as, but not limited to, presenting the updated cybersecurity analytics content data in the form of a drive coupled to the network device 115, 125, 135, or cybersecurity appliance 110. The cybersecurity analytics content data may be comprised of various data packages as needed including functions, applications, data files, and/or databases. As those skilled in the art will recognize, a variety of data formats may be utilized to transmit cybersecurity analytics content update data.

In many embodiments, the creation or reception of updated cybersecurity analytics content data will begin the analyzer update process within the cybersecurity agent 116 or cybersecurity appliance 110. The structure of cybersecurity agents 116, and cybersecurity appliances 110 are discussed in more detail below within the discussion of FIG. 2.

As those skilled in the art will recognize, the specific naming, order, and number of devices and logics may vary within the cybersecurity analyzer update and concurrent management system 100 based on the desired application. It is contemplated that the content update system 130 may be deployed as a device but may also be implemented in a cloud computing service for delivery and distribution of the updated cybersecurity analytics content data as described. Furthermore, it is also contemplated that the functionality of one or more content update systems 130 may be incorporated into another management system when malware updating is to be conducted at a centralized resource. By way of example and not limitation, a private organization may incorporate a content update system 130 to distribute updated cybersecurity analytics content data developed on its own cybersecurity systems.

Figure 2:
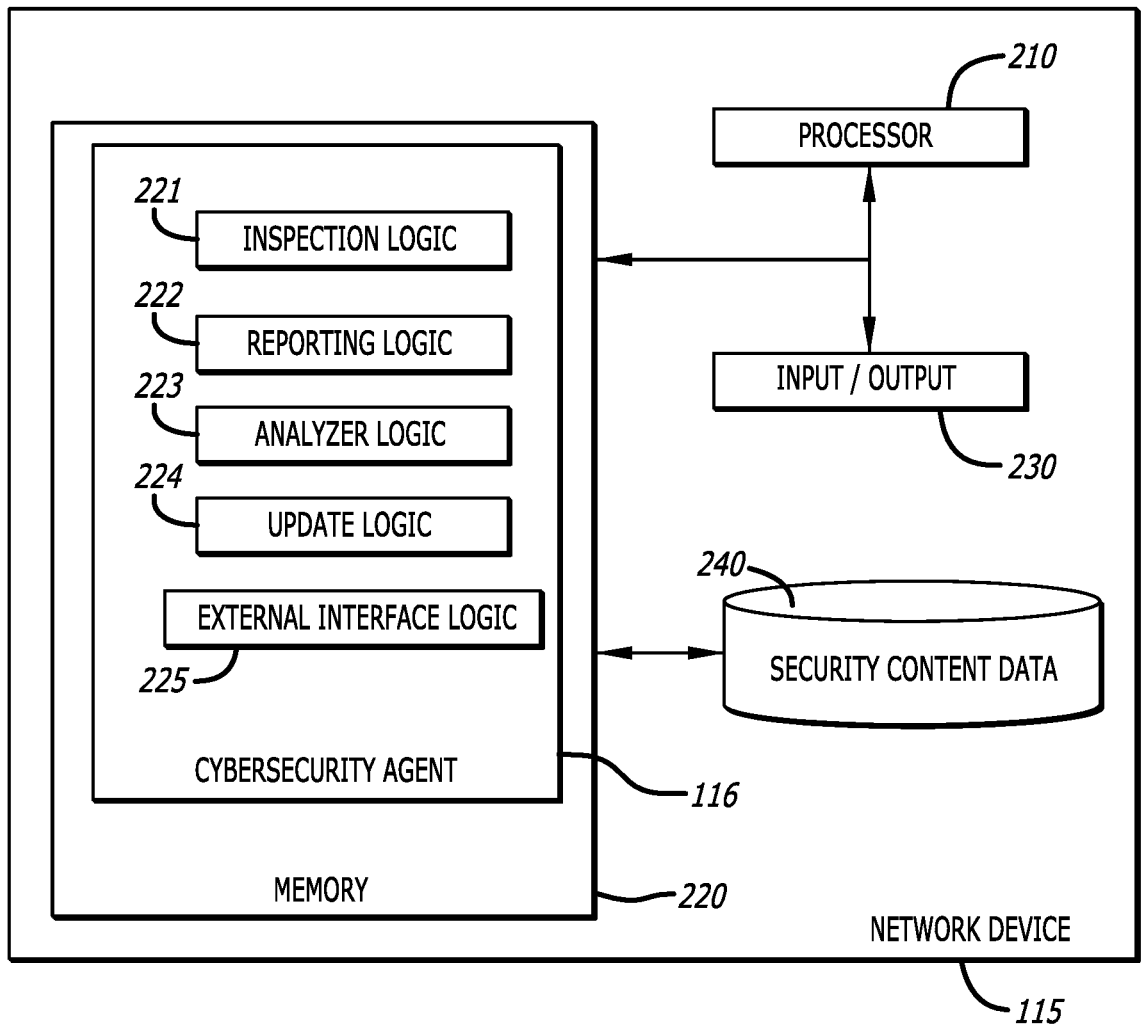
FIG. 2 depicts an exemplary hardware block diagram of a network device comprising a cybersecurity agent in accordance with an embodiment of the invention.

Referring now to FIG. 2, an exemplary hardware block diagram of a network device 115 is shown. The network device 115 has one or more processors (e.g., CPUs) 210, which are coupled to communication input/output interfaces 230 as well as to a persistent memory system 220. Additionally, the network device 115 can also have a security content data store 240 which may include data utilized by one or more logics 221-225 within the cybersecurity agent 116. In some embodiments, the input/output (I/O) interface 230 may be implemented as a physical interface including one or more ports for wired connectors. Alternatively, the input/output interface 230 can be implemented as a digital communication logic between the cybersecurity agent 116 and other software interfaces. Additionally, or in the alternative, the input/output interface 230 may be implemented with one or more radio units for supporting wireless communications with other electronic devices.

Within the persistent memory system 220 of the embodiment depicted in FIG. 2, a cybersecurity agent 116 can include various logics including inspection logic 221, reporting logic 222, analyzer logic 223, update logic 224, and external interface logic 225. In some embodiments, the security content data store 240 holds security content data within the cybersecurity agent 116.

In a number of embodiments, the update logic 224 can be utilized for the network device 115 to receive and manage updated cybersecurity analytics content data that is then stored within the security content data store 240. This process may be effected through the use of a user interface (e.g., a graphical user interface or a network interface to a remote administrator console) represented by input/output 230 that prompts the user/system administrator for authorization for commencing an update. In certain embodiments, the cybersecurity analyzer update process may automatically be authorized or executed without any user input. Additionally, the choice between manual and automatic updating may be evaluated by update logic 224 through one of a number of predetermined or administrator-customizable rules (which may be included in the security content data and themselves subject to update). initiation of the update process can be based on a number of factors, including, but not limited to, the type of threat, the number of evaluations done over a given period of time, time of day generation occurs, and/or the security level of the given user.

In further embodiments, the inspection logic 221 can be utilized to inspect objects for threats. In certain embodiments, the inspection logic 221 may facilitate the updating process in lieu of the update logic 224 which may not be present in said embodiments. In additional embodiments, the inspection logic 221 may inspect network content for threats or select which objects may need to be further inspected for threats. In some embodiments, the inspection logic 221 may receive an object for inspection and communicate with the analyzer logic 223, which can generate an analyzer based on the type of content (e.g., network traffic, email, documents, etc.) that needs to be inspected. In some embodiments, the inspection logic 221 may be configured such that no changes are needed to the system for the inspection logic 221 to facilitate the cybersecurity analyzer update and concurrent management process. In this way, the cybersecurity analyzer update and concurrent management system 100 may be deployed more easily on legacy systems. In still further embodiments, the inspection logic 221 may be configured to manage the queueing process for the objects that are to be inspected for threats.

In a variety of embodiments, the inspection logic 221 may also facilitate selection of suspicious network content and objects for further inspection. The inspection logic 221 can be configured to store and otherwise utilize indicators such as signatures or other identifying characteristics of objects in order to better facilitate selection and detection of items that require further analysis for potential threats. In some embodiments, the inspection logic 221 may evaluate indicators of compromise that may or may not be determinative of the classification of the object along with characteristics of the object including associated communication protocol anomalies. In additional embodiments, the inspection logic 221 may be updated through the analyzer update process to include new methods, triggers, or signatures for improved inspection.

In many embodiments, reporting logic 222 can be utilized to generate reports, display screens (e.g., on administrator consoles), emails, or other communications via the input/output interface 230 to the user/system administrator informing them of the results of the threat inspections. In further embodiments, the reporting logic 222 may trigger an action (e.g., to remediate a threat) based on a predetermined or customizable rule set subject to update through the analyzer update process. In still further embodiments, the reporting logic 222 may be updated by the updated cybersecurity analytics content data such that responses to certain threats may change and thus yield a different response, such as when a particular threat is found to be more harmful or pervasive requiring a more aggressive and immediate response, or vice-versa.

In numerous embodiments, the analyzer logic 223 can be utilized to generate a plurality of analyzers to evaluate threat levels of certain objects. In some embodiments, the analyzer logic 223 may include an analyzer generation logic shown as 305 of FIGS. 3A and 3B, which can receive an object, determine the proper analyzer for assessing threats from said object, and generate the determined proper analyzer. Analyzers may be generated in response to the content of the suspicious object and/or the available rules for evaluating the content. In some embodiments, the analyzers may be implemented utilizing data and parameters stored as a dynamic link library ("dll") or a shared object library within the operating system. In certain embodiments, the analyzer generation logic may examine the object data for an object data type and determine a first subset (i.e. one or more) of analyzers for use in the analyzer logic 223. Furthermore, the analyzer generation logic 305 may also examine context data obtained (e.g., contemporaneously with the object) to select a second sub-set of analyzers from within the selection of analyzer logic 223 to further analyze the object or to analyze the sub-objects extracted from the object, e.g., during processing. Context data may include data associated with the suspicious object, which may be, but is not limited to file type, transmission source, time received, location received, and other data related to the operating environment of the network device 115 the suspicious object was retrieved from, as discussed in more detail below. By way of example and not limitation, the analyzer generation logic can analyze received object data and determine that the object is an email type, which yields a first selection of analyzers from within the analyzer logic 223. In various embodiments, the analysis may be done in parallel (concurrently or in an overlapping fashion) or sequentially by a plurality of analyzers with their results able to be correlated against one another or against other known malware by another logic such as the inspection logic 221.

It can be understood by those skilled in the art, that context data can be utilized to add relevant information to evaluation of the threat level of an object. In various embodiments, the context data may aid in the determination of what/which analyzers to utilize. Context data may also include a variety of types of information regarding the computing environment associated with the network device 115 the suspicious object was retrieved from, including, but not limited to, operating system data, operating system settings, network settings, network security settings, local evaluation data, software data, software settings, and/or software version. It would be obvious to those skilled in the art that context data may include other forms of data not specifically outlined above which may aid in the analysis of the threat level undertaken on a suspicious object.

In still further embodiments, the analyzer generation logic 305 may also analyze context data associated with the object and determine, for example, what version of email client that might be used by a user or system. In response to this determination, the analyzer generation logic may select a second set of analyzers from within the analyzer logic 223 that correspond to different versions of the email client. The selected analyzers may analyze the object within multiple environments wherein the client versions are different. The analyzer logic 223 may employ a single analyzer or multiple analyzers to evaluate a single object. Additionally, these multiple analyzers may be synchronous or asynchronous in nature, depending on the settings or computing environment involved. Analyzer logic is discussed in more detail in conjunction with FIGS. 3A-3B.

In a variety of embodiments, the security content data store 240 is configured to store content utilized by logics within the cybersecurity agent 116. The content update data may include, but is not limited or restricted to, analyzer data, scanning or inspection rules, heuristics, other digital signatures indicative of threats, threat correlation/classification rules and/or remediation rules. For example, during the analyzer update process, the update logic 224 may direct the received data to be stored within the security content data store 240 as updated security content data prior to deploying within the analyzer logic 223. In certain embodiments, the security content data store 240 can be located externally from the network device 200. In some embodiments, the external updated cybersecurity analytics content data can be provided via a cloud-based service. In additional embodiments, the security content data store 240 may be contained within another logic 221, 222, 223, 224, 225 within the cybersecurity agent.

In a number of embodiments, an external interface logic 225 may be utilized to provide a method of incorporating external or third-party tools within the cybersecurity agent 116. By way of example and not limitation, a third-party virus scanner may be utilized to supplement the malware detection methods. In certain embodiments, the external interface logic 225 may be utilized to receive updated cybersecurity analytics content data from sources not associated with the vendor of the cybersecurity agent 116. In these cases, the settings or rules regarding such third-party data and related interfaces may be administered by the system user/administrator.

Cybersecurity appliances 110 may also be deployed and function equivalently to the network devices 115 comprising cybersecurity agents 116; however, the cybersecurity appliance often constitutes a specific network device designated, either solely or partially, to conduct cybersecurity analytics on one or more objects to determine whether any of the objects is a cybersecurity threat. A cybersecurity appliance 110 can be communicatively coupled with a network 120 via an input/output interface, where the network 120 may operate as a public network such as the Internet or a private network (e.g., a local area network "LAN", wireless LAN, etc.). A cybersecurity appliance 110 may be configured to monitor or scan nearly all network traffic going into and out of a monitored system or devices. In some embodiments, the cybersecurity appliance 110 may work in cooperation with monitoring software installed on a network device without a cybersecurity agent installed to scan all newly stored, deleted or modified files within a file system of the monitored network device. In other embodiments, the cybersecurity appliance 110 may work cooperatively with a cybersecurity agent 116 commutatively coupled with the cybersecurity appliance 110. In these embodiments, the cybersecurity agent 116 may offload suspicious objects for analysis or may request a secondary or more thorough inspection of the suspicious object. It is contemplated that the cybersecurity appliance 110 may comprise logics and data stores equivalent to those found within a cybersecurity agent 116. As those skilled in the art would understand, due to the increased volume of suspicious objects to evaluate, a cybersecurity appliance 110 may be configured in some embodiments to operate such that real-time or near real-time analysis is not required, unlike cybersecurity agents 116 which typically operate at real-time or near real-time on suspicious objects encountered during normal operation of the network device 115. In some instances, the cybersecurity agent 116 may accomplish real-time or near real-time operation by prioritizing suspicious objects for inspection and/or offloading objects to external cybersecurity agents 116 operated on other network devices 125, 135 or to connected cybersecurity appliances 110.

III. Analyzer Update Process

Figure 3A:
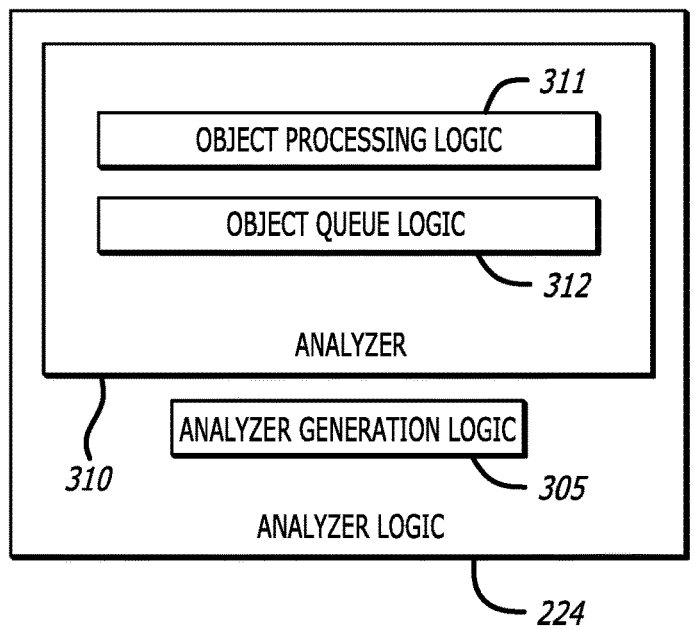
FIG. 3A depicts an exemplary analyzer logic with a first instantiated analyzer in accordance with an embodiment of the invention.

Referring to FIG. 3A, an exemplary analyzer logic $223_1$ may feature a first analyzer 310 which can be launched (i.e., generated) by an analyzer generation logic 305. The analyzer 310 can include object processing logic 311 and object queue logic 312. In various embodiments, the object queue logic 312 can receive a series of objects for threat analysis. The object queue can provide an ordering of objects for analysis by the rule processing logic, where the ordering may be performed in accordance to a selected parameter or parameters (e.g. time of receipt, object type, (e.g., where a webpage may be given the highest priority, and an email is given a higher priority than others, e.g., a document file, etc.), the source of the object type, etc.). In certain embodiments, the object queue logic 312 is separate from the queue found within an inspection logic 221 (FIG. 2) of a cybersecurity agent or appliance. In other embodiments, the object queue logic 312 can be optional and the first analyzer 310 instead receives objects directly from the queue of the inspection logic 221 (FIG. 2).

In some embodiments, the analyzer logic $223_1$ may utilize pre-generated analyzers available in other systems. In certain embodiments, the analyzers may be behavioral analyzers comprising instrumented virtual machines to process the object. The analyzers can be configured according to the context data on which to base the settings of the analyzer. In additional embodiments, the analyzers may emulate a specific computing environment and monitor various settings such as, but not limited to, buffer, memory reads/writes, and/or function calls and returns. It is contemplated that the analyzers utilized by the analyzer logic may include a variety of analyzers and may also include other analyzer types based upon the application needed.

In further embodiments, the object processing logic 311 can be utilized to process the received object to determine an overall threat level. In still further embodiments, this threat determination may result in a numerical score that is passed back to the inspection logic 221 (FIG. 2) for further processing. A variety of analyzers may be generated based on the type of content under analysis. Additionally, the object processing logic 311 may be subject to update during the analyzer update process.

In embodiments wherein the analyzer generation logic 305 receives objects for analysis, the object can be parsed to determine the object type (or can determine the object type from received context data) to determine at least one analyzer configured to analyze the object. The selected analyzers may perform a variety of analytics on the suspicious object, including static and dynamic analyses. In certain embodiments, the analyzers may utilize dynamic methods of analysis including virtual machines that attempt to open, execute or otherwise process the objects in a monitored runtime environment. For these purposes, the virtual machine may be provisioned with an operating system and applications (e.g., web browser, email application, document reader, etc.) required to process the object (e.g., webpage, email, document, etc.). In additional embodiments, the analyzers may analyze the suspicious object in an emulated environment. Under such dynamic analyses, the analyzer may examine the characteristics of the file during and after execution. These characteristics may include the types of data stored as a result of the object's execution, calls made to other systems, contents of memory stacks, etc. The analyzers can then log the results of the monitoring and classify the object. In some embodiments, classification is done by correlating the results against known malware. Correlation can be configured to aggregate the analyzer data in accordance with any desired grouping. One grouping may be based on the source of the suspicious object under analysis, while another grouping may be based upon the file type of the suspicious object. The correlation may be compared to a plurality of thresholds which can be indicative of an object's overall threat level. These thresholds may be based on known malware and can be updated based on newly updated cybersecurity analytics content data. In further embodiments, the analyzers may utilize static means of threat analysis including, but not limited to, examining object characteristics without execution, and/or generating a hash of the object for comparison with a pre-existing hash database.

In certain instances, the object being analyzed by the analyzer, may generate or locate an embedded object (sub-object) that itself may need to be evaluated. By way of example and not limitation, a text file may contain a hyperlink to an external website, which itself should be evaluated as part of the overall threat analysis. As such, the analyzer generation logic 305 may determine if new objects have been found within the analyzed object. When embedded objects are found, the analyzer generation logic 305 can again select an analyzer based upon the embedded object to conduct analysis on the embedded object described above. When all objects have been found and no further embedded objects are determined, the analyzer logic 223 may then generate and return a value related to the threat level of the object and any sub-object, which can then be aggregated with the results of either the inspection logic or other similar logic to determine the overall results and generate a final threat score. In additional embodiments, the analyzer logic $223_1$ correlates the threat values against other analyzers or static analyses, generates a final score, and then provides those results back to the calling logic, such as the inspection logic for further processing.

The classification of threat level (e.g., as malware or benign) can be realized through a variety of techniques including comparison of the results and/or final score to a set of predetermined thresholds or rules. In many embodiments, a responsive action may be taken and/or a report generated based upon the classification of the score data generated by the analyzer logic $223_1$. Those skilled in the art will recognize that various types of rules, heuristics, or other comparisons can be made in order to generate an overall threat determination. When updated cybersecurity analytics content data is received by the cybersecurity agent or appliance, the analyzer logic $223_1$ may be updated which could include receiving new types of analyzers that can be generated by the analyzer generation logic 305, or updating the types of rules, heuristics, or comparisons within the object processing logic 311. The processing of updates to these components in a seamless updating system is described in more detail in FIG. 3B.

Figure 3B:
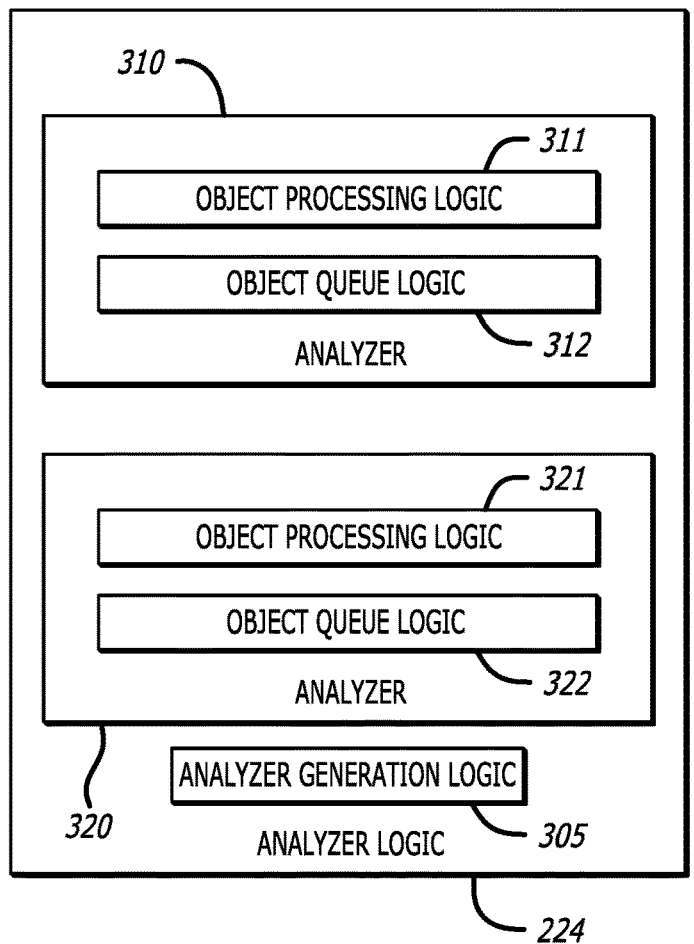
FIG. 3B depicts an exemplary analyzer logic with a first instantiated analyzer and second updated, instantiated analyzer in accordance with an embodiment of the invention.

Referring to FIG. 3B, an analyzer logic $223_2$ with a first analyzer 310 and second updated analyzer 320 in accordance with an embodiment of the invention is shown. In response to receiving updated cybersecurity analytics content data, the analyzer logic may generate a second analyzer 320 which comprises updated data. In many embodiments, the second analyzer 320 can also include an object processing logic 321 which may comprise updated rules, heuristics, or other comparisons, in addition to an object queue logic 321. In some embodiments, the analyzer generation logic 305 may be a separate logic or included within another logic within the cybersecurity agent 116 or cybersecurity appliance 110.

In a variety of embodiments, the analyzer logic 223 would have a first analyzer 310 receiving and queueing objects within the first object queue logic 312 for threat analysis. In response to received updated cybersecurity analytics content data, the analyzer generation logic 305 can generate a second analyzer 320 which may then be configured to receive any subsequent objects for threat analysis that would have otherwise been directed to the first analyzer 310. In certain embodiments, the updated second analyzer 320 may be similar to the first analyzer 310 with the exception of an updated object processing logic 321. In other embodiments, the second analyzer 320 may be an entirely new analyzer type or variation entirely different from the first analyzer 310.

During the analyzer update process, once the updated second analyzer 320 is generated and accepting new objects for threat analysis, the first analyzer 310, and in particular the object queue logic 312, may then cease to receive objects for threat evaluation. In some embodiments, the object queue of the first analyzer is linked to the corresponding queue within the second analyzer and, when the second, updated analyzer is successfully launched, will terminate queueing actions within the first analyzer object queue. In response to the queue of the first analyzer 310 being depleted (i.e. having no more objects to analyze), the first analyzer 310 may then be subject to termination or reclamation via normal memory management systems. In this way, the analyzer logic $223_2$ may continue to accept and process objects for threat detection without a pause in normal operation. Additionally, because the analyzer generation logic 305 can generate entirely new analyzers as they are updated, the analyzers 310, 320 do not require additional programming in order to facilitate the analyzer update process, reducing programming complexity and allowing for implementation in previously installed systems. The analyzer update and concurrent management process is described in more detail below.

IV. Analyzer Update and Concurrent Management Process

Figure 4:
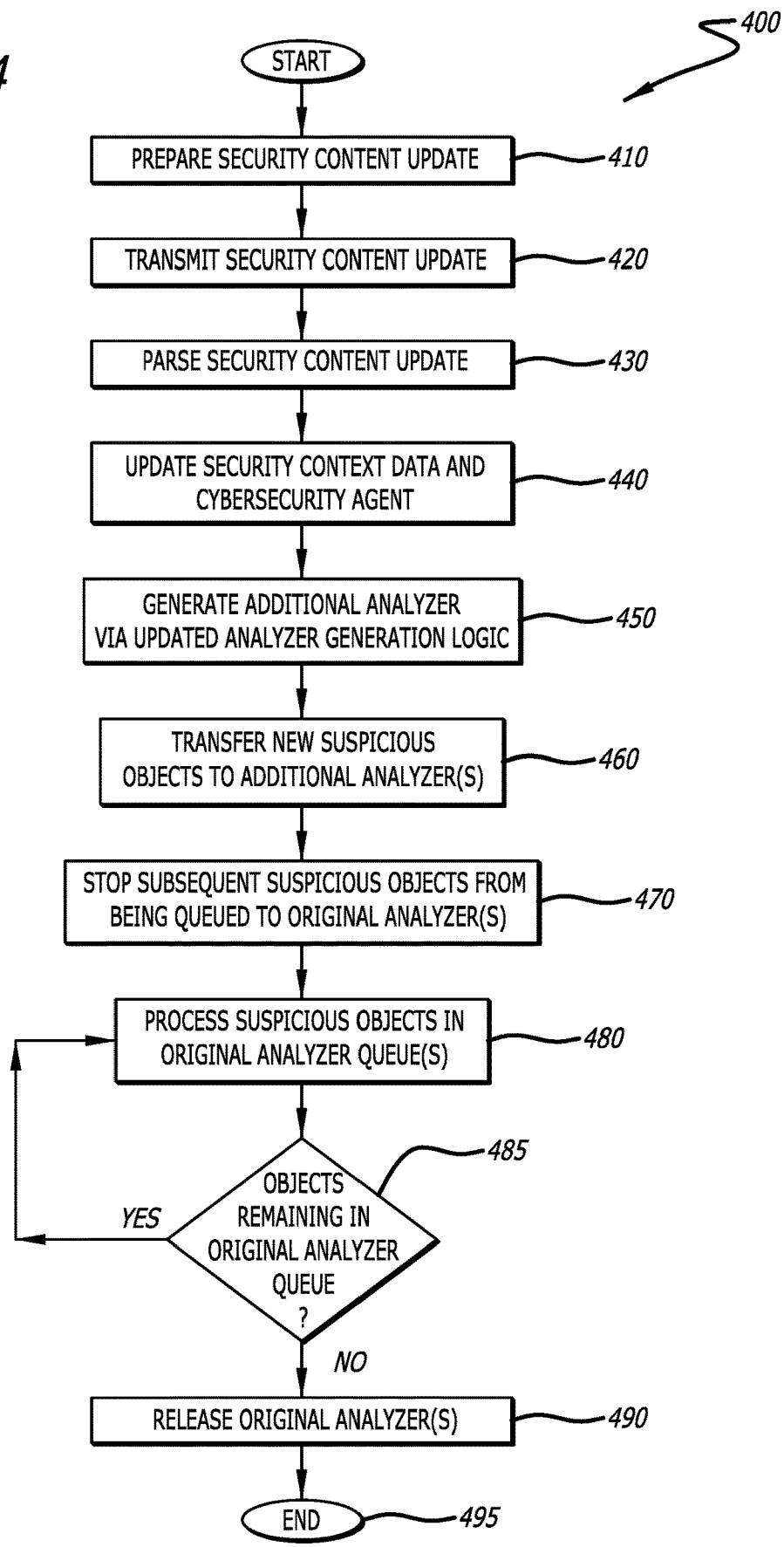
FIG. 4 is an exemplary flowchart of a seamless update process in accordance with an embodiment of the invention.

Referring now to FIG. 4, an exemplary flowchart of an analyzer update and concurrent management process 400 is shown. In many embodiments, the analyzer update and concurrent management process 400 starts by preparing updated cybersecurity analytics content data (block 410). In a variety of embodiments, the updated cybersecurity analytics content data can be generated by a cybersecurity agent or cybersecurity appliance vendor which is then distributed to all of the vendor's deployed cybersecurity agents or cybersecurity agents. In other embodiments, the security content update data can be generated internally by, for example, an enterprise or other organization deploying a number of the cybersecurity agents or cybersecurity appliances.

In response to updated cybersecurity analytics content data being generated, it is transmitted to corresponding cybersecurity agents and/or appliances (block 420). In some embodiments, the updated cybersecurity analytics content data may be transferred to an endpoint device from a cybersecurity appliance or administrator console or other content management device. When the updated cybersecurity analytics content data is transmitted successfully, the receiving cybersecurity agent or cybersecurity appliance can then parse the updated cybersecurity analytics content data (block 430). In some embodiments, the updated cybersecurity analytics content data may comprise any mixture of updated rules, heuristics, digital signatures, analyzers, or threshold settings. The parsing of the data allows the updated cybersecurity analytics content data to be identified, extracted and transmitted to the proper logic or data store within the network device.

Once received, the process can begin to update the security content data store 240 as well as any cybersecurity agent logic as required (block 440). In response to a successful update, an inspection logic may be tasked with determining a threat analysis to be performed on a suspicious object and request the use of an analyzer. In a variety of embodiments, the analyzer generation logic may then determine what type of analyzer should be instantiated to assess the received object and conduct the threat analysis. With the newly updated analyzer generation logic or other cybersecurity analytics content data, the analyzer generation logic can generate an additional analyzer comprising the updated rules and other logic (block 450).

Once an updated analyzer has been generated, any subsequent objects for threat analysis that would otherwise be fed into the queue of the first analyzer, are now directed into the queue of the second analyzer (block 460). In certain embodiments, the queue can signal that a successful launching of the updated second analyzer has occurred and may start transferring (that is, making available) subsequent suspicious objects to the second analyzer. In some embodiments, some or all of the contents (or pointers/references to the contents) of entries within the queue for the first analyzer are copied to the queue of the second analyzer. In a number of embodiments, this queueing operation to the updated analyzer is handled by the inspection logic that requested the threat analysis. As a result of the successful generation of an updated analyzer which is operable to accept suspicious objects for analysis, the seamless update process 400 then stops queueing new suspicious objects to the original, first analyzer (block 470).

Any objects that remain in the queue of the first analyzer remain active and are processed within the first analyzer (block 480). If after processing a suspicious object in the first analyzer queue, there are more objects to analyze, the original analyzer continues to analyze the objects for threats until there are no more objects remaining in the original object queue (block 485). Once the queue for the original analyzer is depleted, the original analyzer may then be terminated or marked for reclamation by the system (block 490). Once the original analyzer is terminated, the process 400 can end with the updated analyzer having taken control of the incoming object queue without any disruption in the flow of objects to evaluate for threats. The timing of the analyzer update and concurrent management update process is described in more detail below.

V. Analyzer Update and Concurrent Management Update Timing

Figure 5:
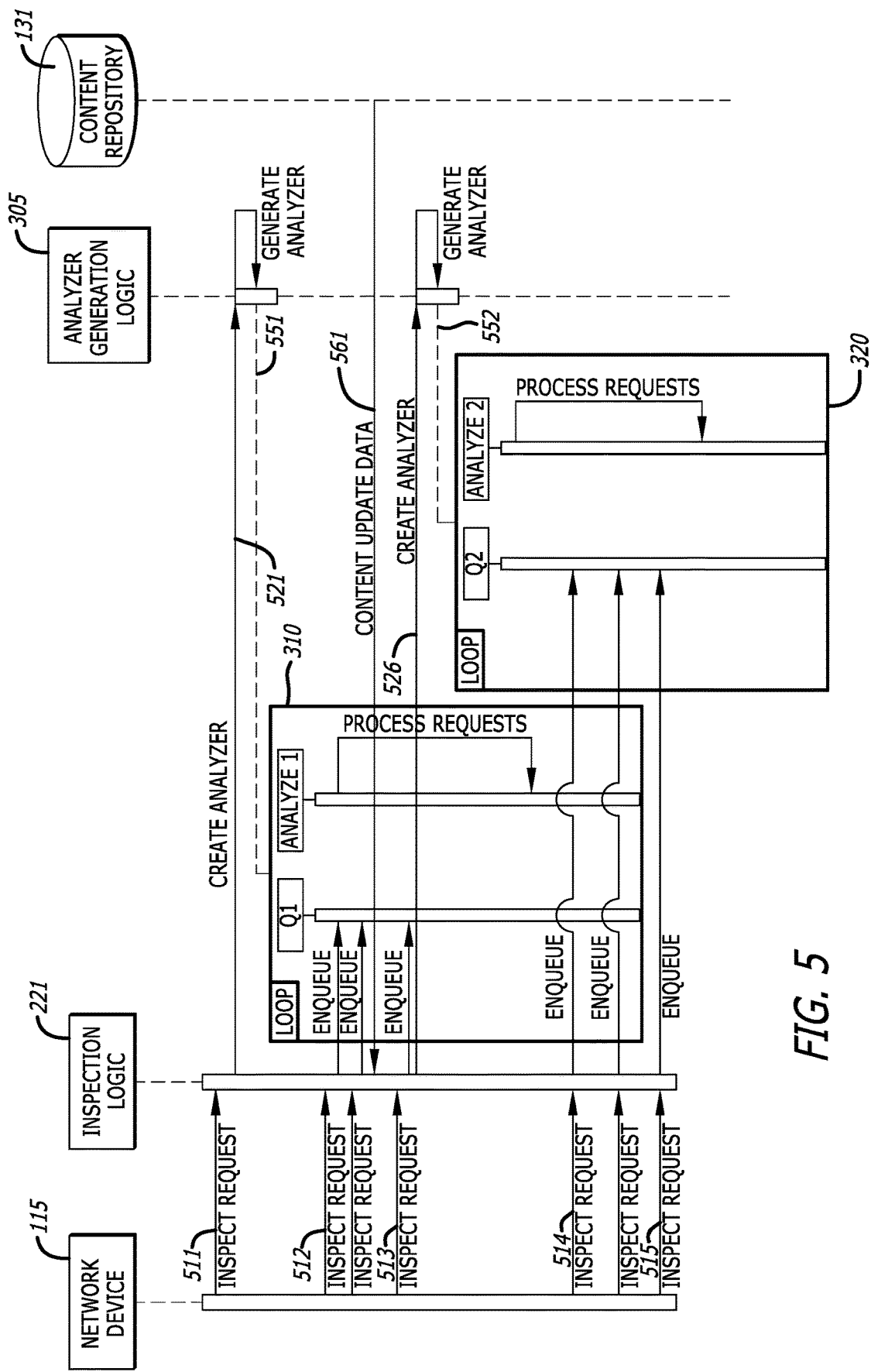
FIG. 5 is an exemplary timing chart illustrating the interoperation between a computing device, inspection logic, analyzer generation logic, content repository and both a first and second, updated analyzer in accordance with an embodiment of the invention.

Referring to FIG. 5, an exemplary timing chart illustrating the interoperation between a network device 115 comprising a cybersecurity agent, inspection logic 221, analyzer generation logic 305, a content repository 131 and both a first analyzer 310 and second, updated analyzer 320 is shown. The analyzer update and concurrent management system 500, comprises at least a network device 115 which itself can comprise a cybersecurity agent with an inspection logic 221. The inspection logic 221 may be able to send requests to an analyzer generation logic 305, which can generate analyzers in response to requests from the inspection logic 221. In many embodiments, the analyzer generation logic 305 is generated by an analyzer logic 223 as taught and described in FIG. 2. The inspection logic 221 may also be in communication with a content repository data store 131 which may be configured to provide security updates to the inspection logic 221. FIG. 5 depicts the network device 115 initially sending a first inspect request 511 to the inspection logic 221. As described above, the inspect request 511 may relate to any object that poses a threat, i.e., that is suspicious. In many embodiments, the inspection logic 221 may inspect the network device 115 and determine which objects to further inspect, thus creating inspect requests from the inspection logic 221 to the network device 115. In response to the first inspect request 511, the inspection logic 221 sends out a first analyzer request 521 to the analyzer generation logic 305. In a variety of embodiments, the inspection logic 221 may not utilize data derived from the suspicious object or discriminate between the various types of objects that may need to be inspected and further analyzed. In these embodiments, the inspection logic 221 may simply ignore the object type and pass the object, or data related to the specific object type or characteristics to the analyzer generation logic 305. The analyzer generation logic 305 may evaluate the incoming data received from the inspection logic 221 and determine what type of analyzer to generate.

In response to the successful creation/launching of an analyzer 310, a first return signal 551 may be generated that is received by the inspection logic 221 which can signal that the first analyzer 310 may now receive objects to evaluate. In response to a subsequent inspect request 512, the inspection logic 221 can enqueue the objects related to the inspect request 512 into the first analyzer 310. It should be noted that the embodiment depicted in FIG. 5 shows the analyzers 310, 320 with their own individual queues Q1, and Q2. In many embodiments, queuing for each analyzer 310, 320 may be provided though a single queue within the inspection logic 221. It will be apparent to those skilled in the art that a variety of queueing structures and design may be utilized to manage the queueing between a plurality of analyzers.

In a number of embodiments, the analyzers 310, 320 receive objects for a threat analysis and return a value to the inspection logic 221 related to that analysis. The analyzers 310, 320 depicted in FIG. 5 may be similar to those depicted and discussed in FIGS. 3A-3B. As such, it should be appreciated that for the sake of clarity, aspects of each analyzer's functions, such as returning a value corresponding to each enqueued inspect request, is omitted from FIG. 5. Additionally, the number of inspect requests and objects sent to analyzers 310, 320 can be much larger than depicted. Finally, it should be understood that the number of analyzers depicted is simplified in order to better the show the analyzer update and concurrent management process. In many embodiments, the inspection logic 221 may call for and utilize any number of analyzers in response to the inspect requests.

In the analyzer update and concurrent management system 500 depicted in FIG. 5, subsequent to the inspect requests 512 having been sent, the content repository data store 131 transmits updated cybersecurity analytics content data 561 to the inspection logic 221. As discussed above, the updated cybersecurity analytics content data 561 may also be sent to a cybersecurity appliance In these instances, the inspection logic 221 does not require a change in its programming or operation, thus allowing for the analyzer update process to be more easily added to and implemented in existing cybersecurity agents and appliances.

In response to the updated cybersecurity analytics content data transmission 561, the rules/signatures regarding inspection of objects, and/or the analyzers themselves may be updated within the cybersecurity agent or security content data store 240. If a new inspect request 513 comes in before the updated cybersecurity analytics content data transmission 561 is finished or the inspection logic 221, or cybersecurity agent 116 has finished updating the core content, the object may still be enqueued within the first analyzer 310. After a period of time, the download of the updated cybersecurity analytics content data is completed and ready to be utilized. When this occurs, the inspection logic 221 may send a second create analyzer call 526 to the analyzer generation logic 305 to generate a second analyzer 320 which comprises the updated rules from the content update data provided by the content repository data store 131.

Both the first analyzer 310 and second analyzer 320 may be active at the same time. However, subsequent objects to be evaluated can now be directed to the second analyzer 320 which utilizes the updated data. The first analyzer 310, in many embodiments, can stay active and continue analyzing the objects still within its queue.

Thus, the inspect request 514 can be evaluated by the second analyzer 320 utilizing the updated rules. For example, the network device 115 may have a first analyzer 310 generated to analyze email content, and subsequently receives a new suspicious email after the second analyzer is successfully generated. In this case however, the inspection logic 221 enqueues the new suspicious email to the second analyzer 320 comprising the updated cybersecurity analytics data. In certain embodiments, suspicious objects may be enqueued within an internal queue associated with either the first analyzer 310 or the second analyzer 320. In additional embodiments, the inspection logic 221 manages the enqueuing process between the multiple analyzers 310, 320. In further embodiments, the queueing for the two analyzers 310, 320 may be handled by a separate queue management logic that is not included within either the inspection logic 221 or analyzers 310, 320.

It should be noted that the seamless update process as depicted in FIG. 5 is shown as a linear, synchronous process for clarity. In numerous embodiments, the analyzer update and concurrent management process, and the entire threat detection process itself may occur in an asynchronous fashion. By way of example and not limitation, the analyzers 310, 320 can acquire a plurality of objects within their respective queues but may not complete the analysis and return a value to the inspection logic 221 immediately. In a number of embodiments, the second analyzer 320 may be generated and receiving new objects for analysis while the first analyzer 310 is still active and processing objects that were placed in the queue prior to the creation of the second analyzer 320. In these circumstances, the first analyzer 310 may still be processing objects from its queue for a period of time after the second analyzer 320 with the updated rules has taken over the duties of inspecting incoming objects. As highlighted in the discussion of FIG. 3B, when the queue of the first analyzer 310 has been depleted, the first analyzer 310 can subsequently be terminated or marked for release and reclamation by memory management or other resource optimization methods.

It should be understood by those skilled in the art that asynchronous implementations may come in a variety of forms. By way of example and not limitation, the first and second analyzers 310, 320 may utilize a "promises and futures" system. In these embodiments, the inspection logic 221 may generate a future for the value of the object that is sent to the analyzers 310, 320 for threat evaluation. In response, the analyzers 310, 320 may generate a promise for each of the received futures. In this way, the inspection logic 221 may comprise a reference to each analyzer as long as it comprises at least one future, and the analyzers 310, 320 may remain active as long as they comprise at least one future. When the second analyzer 320 has been instantiated and begins to receive new objects for analysis, the inspection logic 221 can release the reference to the first analyzer 310. In some embodiments, the termination or marking for release is not done until all futures have been returned by the first analyzer 310. In additional embodiments, the first analyzer 310 would remain active until it runs out of promises. When this happens, the first analyzer 310 is then subject to termination or reclamation by the system in accordance to whatever resource optimization scheme is being utilized.

As shown in FIG. 5, the first post-update inspect request 514 is made to the second analyzer 320 while the first analyzer 310 is still active. However, by the last inspect request 515, the first analyzer 310 has completed its queue and has been released and reclaimed. It should be understood by those skilled in the art that FIG. 5 is simplified for clarity and that the specific timing and number of inspect requests can vary greatly in size and scope depending on the system used, the data being inspected, and the level of threat detection desired.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An electronic device for receiving and seamlessly updating a cybersecurity agent comprising:
   a processor; and
   a non-transitory storage medium communicatively coupled to the processor, the non-transitory storage medium comprises the cybersecurity agent that comprises:
      an analyzer logic configured to receive cybersecurity analytics content data and generate a first analyzer, the first analyzer is configured to receive a suspicious object for threat evaluation and to conduct one or more threat evaluation operations based on a portion of the cybersecurity analytics content data,
      an inspection logic configured to manage a queue and to receive and assign a first plurality of suspicious objects to the first analyzer for threat evaluation, and
      an update logic configured to receive updated cybersecurity analytics content data,
   wherein the analyzer logic is further configured to receive the updated cybersecurity analytics content data from the update logic and generate a second analyzer that conducts one or more threat evaluation operations based on at least a portion of the updated cybersecurity analytics content data and
   wherein the inspection logic, in response to the generation of the second analyzer, is configured to assign a second plurality of suspicious objects that would have otherwise been directed to the first analyzer to the second analyzer for threat evaluation while both the first analyzer and the second analyzer operate concurrently as the first analyzer continues to process the first plurality of suspicious objects remaining in the queue for threat evaluation based on at least the portion of the cybersecurity analytics content data as the second analyzer processes the second plurality of suspicious objects for threat evaluation based on at least the portion of the updated cybersecurity analytics content data.

2. The electronic device of claim 1, wherein each of the cybersecurity analytics content data and the updated cybersecurity analytics content data comprises any combination of one or more of updated rules, heuristics, digital signatures, analyzer or threshold settings.

3. The electronic device of claim 1, wherein the first analyzer is terminated upon depleting of the first plurality of suspicious objects in the queue assigned to the first analyzer.

4. The electronic device of claim 3, wherein the queue is managed asynchronously.

5. The electronic device of claim 4, wherein the asynchronous management is a futures and promises system.

6. The electronic device of claim 1, wherein the updated cybersecurity analytics content data is received from a remote content repository.

7. The electronic device of claim 1, wherein the analyzer logic utilizes an analyzer generation logic to generate the first analyzer and the second analyzer.

8. The electronic device of claim 7, wherein the updated cybersecurity analytics content data received by the analyzer logic updates the analyzer generation logic prior to the generation of the second analyzer.

9. The electronic device of claim 7, wherein the analyzer generation logic produces a new type of analyzer suitable for analyzing novel file types.

10. The electronic device of claim 1, wherein the first analyzer comprises a first object processing logic that operates in accordance with a first set of rules included as part of the cybersecurity analytics content data, and the second analyzer comprises a second object processing logic that operates in accordance with a second set of rules included as part of the updated cybersecurity analytics content data, the second set of rules being different than the first set of rules.

11. A method for seamlessly updating a cybersecurity system comprising:
receiving a first plurality of suspicious objects for potential threat analysis;
generating, by an analyzer logic of the cybersecurity system, a first analyzer configured to analyze the received first plurality of suspicious objects based on at least a portion of cybersecurity analytics content data;
managing, by an inspection logic of the cybersecurity system, a queue to assign the received first plurality of suspicious objects to the first analyzer for analysis;
receiving, by an update logic of the cybersecurity system, updated cybersecurity analytics content data;
generating, by the analyzer logic, a second analyzer configured to analyze suspicious objects based on at least a portion of the updated cybersecurity analytics content data, wherein the second analyzer contains at least one change from the first analyzer in response to the received updated cybersecurity analytics content data;
receiving, by the inspection logic, a second plurality of suspicious objects for potential threat analysis; and
managing, by the inspection logic, the queue to transfer assigned suspicious objects from the received second plurality of suspicious objects that would have otherwise been directed to the first analyzer to the second analyzer for analysis wherein the transfer between the assignment of the first plurality of suspicious objects and the second plurality of suspicious objects does not comprise a pause in receiving suspicious objects as both the first analyzer and the second analyzer operate concurrently as the first analyzer continues to analyze objects associated with the first plurality of suspicious objects remaining in the queue for threat evaluation based on at least the portion of the cybersecurity analytics content data as the second analyzer analyzes objects associated with the second plurality of suspicious objects for threat evaluation based on at least the portion of the updated cybersecurity analytics content data.

12. The method of claim 11, wherein each of the cybersecurity analytics content data and the updated cybersecurity analytics content data comprises any combination of one or more of updated rules, heuristics, digital signatures, analyzers, or threshold settings.

13. The method of claim 12, wherein the first analyzer is terminated after the first plurality of suspicious objects has been analyzed.

14. The method of claim 13, wherein the queue management of the first plurality of suspicious objects and the queue management of the second plurality of suspicious objects are managed asynchronously.

15. The method of claim 14, wherein the asynchronous management is a futures and promises system.

16. The method of claim 11, wherein the updated cybersecurity analytics content data is received from a remote content repository.

17. The method of claim 11, wherein the first analyzer and the second analyzer are generated from an analyzer generation logic of the analyzer logic.

18. The method of claim 17, wherein the received updated cybersecurity analytics content data updates the analyzer generation logic prior to the generation of the second analyzer.

19. The method of claim 18, wherein the updated analyzer generation logic can produces a new type of analyzer suitable for analyzing novel file types.

20. The method of claim 11, wherein the first analyzer comprises a first object processing logic that operates in accordance with a first set of rules included as part of the cybersecurity analytics content data, and the second analyzer comprises a second object processing logic that operates in accordance with a second set of rules included as part of the updated cybersecurity analytics content data, the second set of rules being different than the first set of rules.

21. A non-transitory storage medium including software for execution by a processor to seamlessly update a cybersecurity agent, comprising:
an analyzer logic of the cybersecurity agent configured to receive cybersecurity analytics content data and generate a first analyzer, the first analyzer is configured to receive a suspicious object for threat evaluation and to conduct one or more threat evaluation operations based on a portion of the cybersecurity analytics content data;
an inspection logic of the cybersecurity agent configured to manage a queue, and to receive and assign a first plurality of suspicious objects to the first analyzer for threat evaluation; and
an update logic of the cybersecurity agent configured to receive updated cybersecurity analytics content data;
wherein the analyzer logic receives the updated cybersecurity analytics content data and generates a second analyzer wherein the second analyzer that conducts one or more threat evaluation operations based on at least a portion of the updated cybersecurity analytics content data; and
wherein the inspection logic, in response to the generation of the second analyzer, is configured to assign a second plurality of suspicious objects that would have otherwise been directed to the first analyzer to the second analyzer for threat evaluation while both the first analyzer and the second analyzer operate concurrently as the first analyzer continues to process the first plurality of suspicious objects remaining in the queue for threat evaluation based on at least the portion of the cybersecurity analytics content data as the second analyzer processes the second plurality of suspicious objects for threat evaluation based on at least the portion of the updated cybersecurity analytics content data.

* * * * *